(12) United States Patent
Vivas

(10) Patent No.: US 9,902,053 B2
(45) Date of Patent: Feb. 27, 2018

(54) KNOCKOUT REMOVAL TOOL

(71) Applicant: Felix Vivas, Park Ridge, IL (US)

(72) Inventor: Felix Vivas, Park Ridge, IL (US)

( * ) Notice: Subject to any disclaimer, the term of this patent is extended or adjusted under 35 U.S.C. 154(b) by 226 days.

(21) Appl. No.: 14/573,955

(22) Filed: Dec. 17, 2014

(65) Prior Publication Data

US 2016/0183418 A1   Jun. 23, 2016

(51) Int. Cl.
*B25B 33/00* (2006.01)
*H02G 1/00* (2006.01)
*H02G 3/08* (2006.01)

(52) U.S. Cl.
CPC .............. *B25B 33/00* (2013.01); *H02G 1/00* (2013.01); *H02G 3/085* (2013.01)

(58) Field of Classification Search
USPC ............................................. 29/267
See application file for complete search history.

(56) References Cited

U.S. PATENT DOCUMENTS

| | | | |
|---|---|---|---|
| 3,713,200 A | 1/1973 | Burns | |
| 3,736,643 A | 6/1973 | Pepe | |
| 4,509,242 A | 4/1985 | Marra | |
| 4,777,849 A * | 10/1988 | Sears | B25B 27/0028 81/8.1 |
| 4,974,477 A * | 12/1990 | Anderson | B25G 1/007 279/23.1 |
| 4,988,272 A * | 1/1991 | Nolan | B25B 33/00 15/235.3 |
| 5,052,209 A * | 10/1991 | DeMaagd | B25B 27/00 72/458 |
| 5,212,860 A * | 5/1993 | Lakey | B25B 9/00 29/270 |
| 5,464,407 A * | 11/1995 | McGuire | A61B 17/15 606/104 |
| 5,778,720 A | 7/1998 | Olexa, Jr. | |
| 5,797,918 A * | 8/1998 | McGuire | A61B 17/15 606/104 |
| 5,937,695 A | 8/1999 | Patterson | |
| 6,108,882 A * | 8/2000 | Hodgson | B25B 27/306 269/6 |
| 6,216,568 B1 | 4/2001 | Breiling | |
| D448,981 S | 10/2001 | Solanki et al. | |
| 6,994,322 B1 * | 2/2006 | Wittman | A44B 15/005 254/131 |
| 7,025,314 B1 * | 4/2006 | Thomas | H02G 3/125 220/3.9 |
| 7,622,672 B2 | 11/2009 | Johnson | |
| 7,954,217 B2 * | 6/2011 | Wu | B25B 27/0028 254/25 |

(Continued)

*Primary Examiner* — George Nguyen

(57) ABSTRACT

A knockout removal tool includes an electrical box. The front side is open. The electrical box may be positioned within a wall such that the front side lies on a plane that is planar with an exposed surface of the wall. A handle has a first end, a second end and an outer wall extending therebetween. The first end is flat. The second end is convexly arcuate. A rod is coupled to the first end. The rod has a distal end with respect to the first end. The rod is inserted through the electrical box such that the distal end is directed toward a knockout in the electrical box. A head is coupled to the rod. The head engages the knockout to facilitate removal of the knockout after the electrical box has been installed and trimmed.

4 Claims, 3 Drawing Sheets

(56) References Cited

U.S. PATENT DOCUMENTS

| | | | |
|---|---|---|---|
| 8,282,079 B2 * | 10/2012 | Petti | H02G 1/08 254/134.3 FT |
| 8,407,839 B2 * | 4/2013 | Crookston | E04D 15/06 29/243.5 |
| 2003/0213343 A1 * | 11/2003 | Schuster | B25B 13/463 81/73 |
| 2005/0067546 A1 * | 3/2005 | Dinh | H02G 3/125 248/343 |
| 2007/0062338 A1 * | 3/2007 | Hsieh | B25B 13/461 81/28 |
| 2008/0035900 A1 * | 2/2008 | Flores | B25B 33/00 254/21 |
| 2008/0257119 A1 * | 10/2008 | McCartney | B25B 13/00 81/180.1 |
| 2009/0151969 A1 * | 6/2009 | Huang | B25B 13/481 173/217 |

* cited by examiner

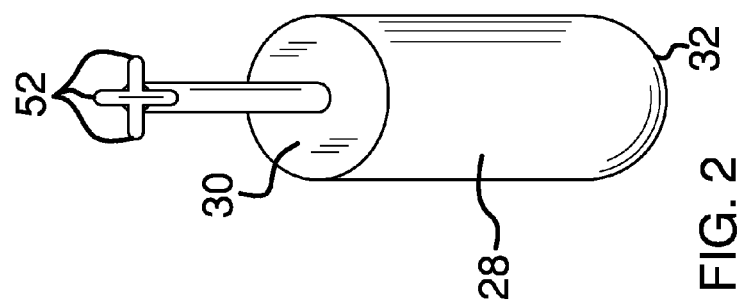
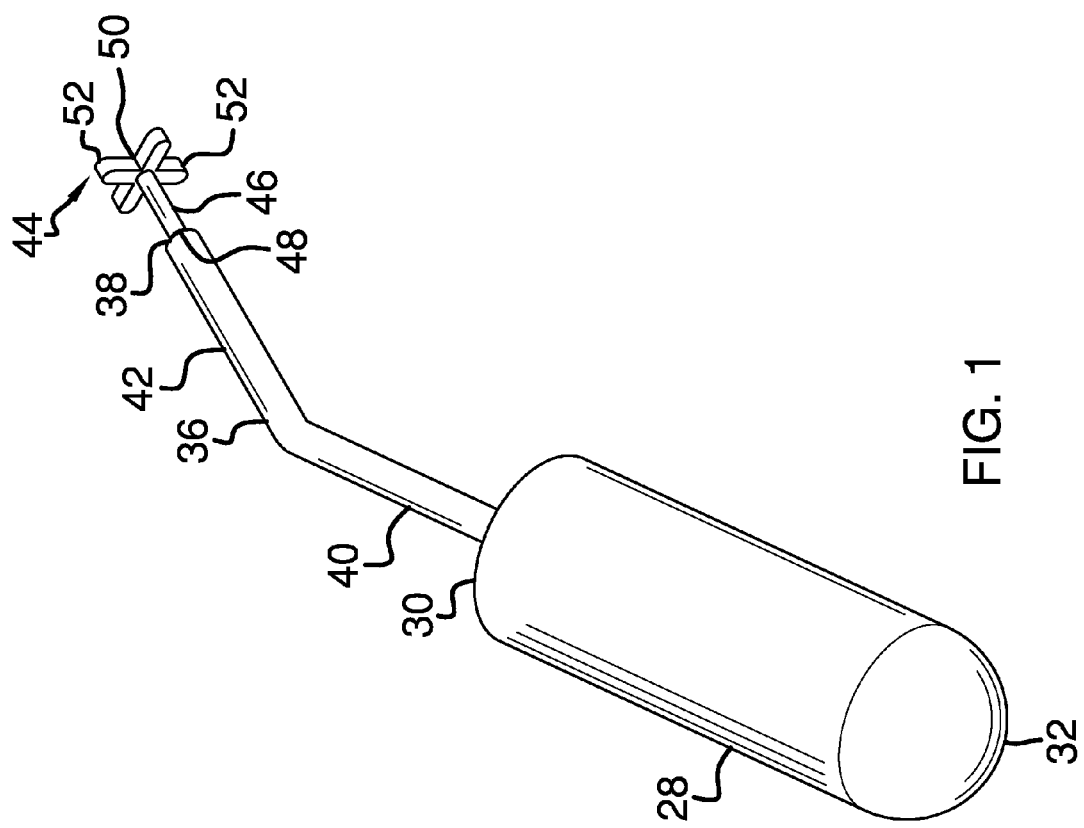

KNOCKOUT REMOVAL TOOL

BACKGROUND OF THE DISCLOSURE

Field of the Disclosure

The disclosure relates to removal tools and more particularly pertains to a new removal tool for removing knockouts from an electrical box after the electrical box has been installed.

SUMMARY OF THE DISCLOSURE

An embodiment of the disclosure meets the needs presented above by generally comprising an electrical box that has a front side and a pair of lateral walls coupled to and extending rearwardly from the front side. The front side is open. Each of the lateral walls has a plurality of knockouts. Each of the knockouts has a cross shaped opening extending therethrough. The electrical box may be positioned within a wall such that the front side lies on a plane that is planar with an exposed surface of the wall. A handle has a first end, a second end and an outer wall extending therebetween. The outer wall is curvilinear such that the handle has a cylindrical shape. The first end is flat. The second end is convexly arcuate. A rod is coupled to the first end. The rod has a distal end with respect to the first end. The rod is inserted through the front side such that the distal end is directed toward one of the lateral walls while the handle remains outside of the electrical box. A head is coupled to the rod. The head engages the knockouts to facilitate removal of the knockouts after the electrical box has been installed and trimmed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a perspective view of a knockout removal tool according to an embodiment of the disclosure.

FIG. 2 is a front view of an embodiment of the disclosure.

DESCRIPTION OF THE PREFERRED EMBODIMENT

Figure 3:
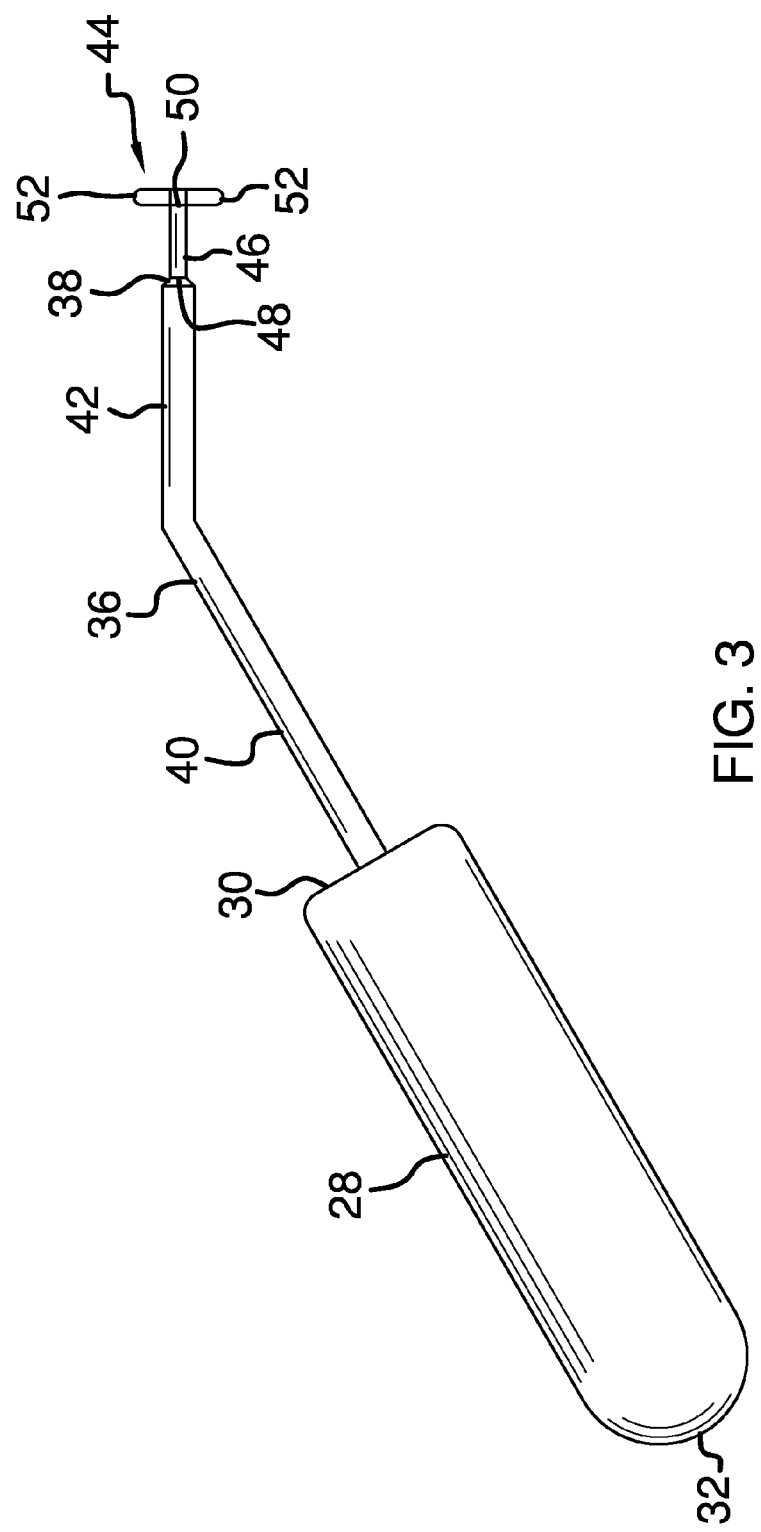
FIG. 3 is a right side view of an embodiment of the disclosure.
Figure 4:
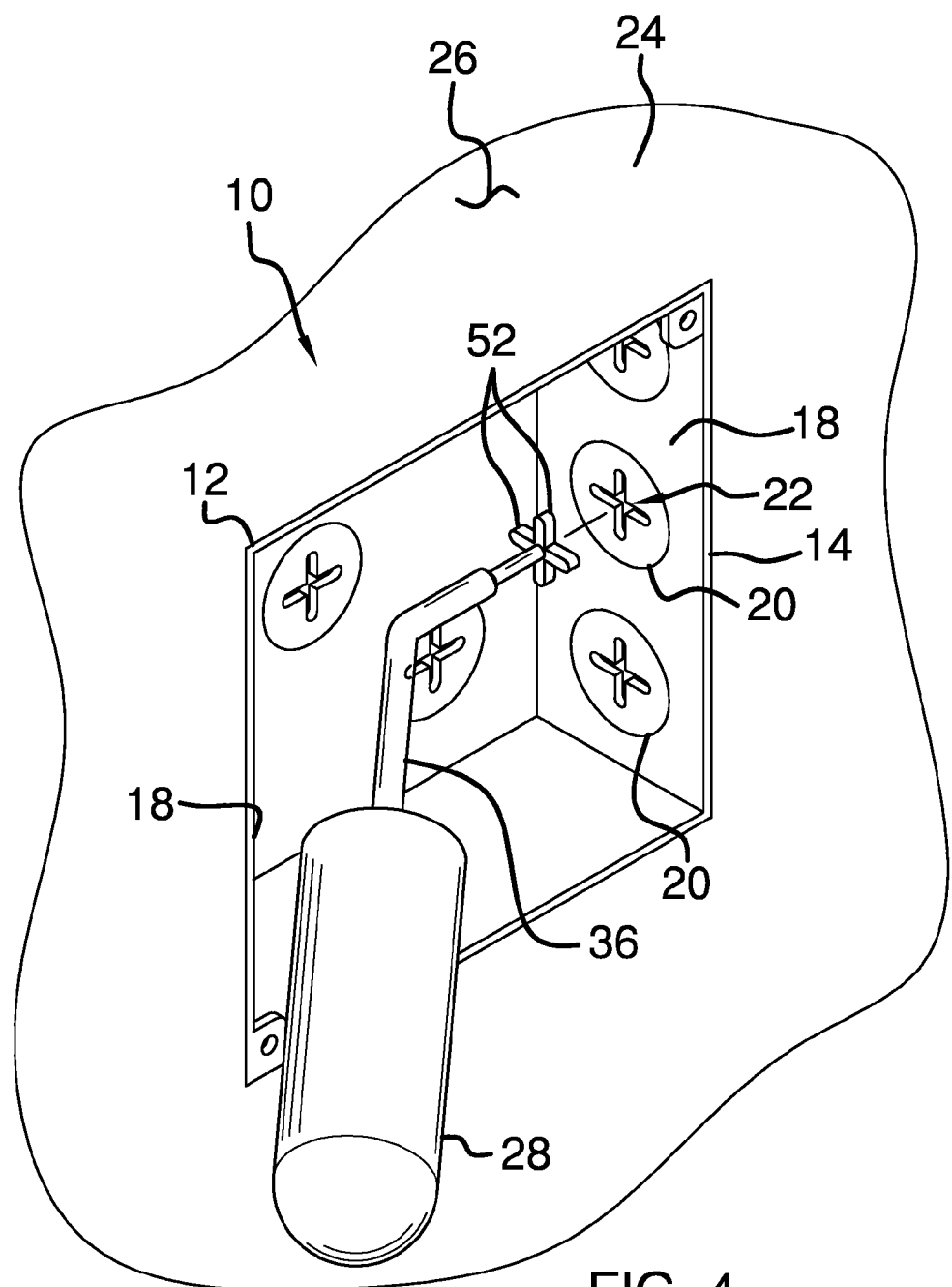
FIG. 4 is an in-use view of an embodiment of the disclosure.

With reference now to the drawings, and in particular to FIGS. 1 through 4 thereof, a new removal tool embodying the principles and concepts of an embodiment of the disclosure and generally designated by the reference numeral 10 will be described.

As best illustrated in FIGS. 1 through 4, the knockout removal tool 10 generally comprises an electrical box 12 that has a front side 14 and a pair of lateral walls 18 coupled to and extending rearwardly from the front side 14. The front side 14 is open. Each of the lateral walls 18 has a plurality of knockouts 20. Each of the knockouts 20 has a cross shaped opening 22 extending therethrough. The electrical box 12 may be positioned within a wall 24 such that the front side 14 lies on a plane that is planar with an exposed surface 26 of the wall 24. The electrical box 12 may be of any conventional design. The wall 24 may be a wall of a building or the like.

A handle 28 has a first end 30, a second end 32 and an outer wall 34 extending therebetween. The outer wall 34 is curvilinear, giving the handle 28 a cylindrical shape. The first end 30 is flat. The second end 32 is convexly arcuate.

A rod 36 is coupled to the first end 30. The rod 36 has a distal end 38 with respect to the first end 30. The rod 36 has a first section 40 forming an angle between 100° and 150° with respect to a second section 42. The rod 36 is inserted through the front side 14 such that the distal end 38 is directed toward one of the lateral walls 18 while the handle 28 remains outside of the electrical box 12.

A head 44 is coupled to the rod 36. The head 44 engages the knockouts 20 to facilitate removal of the knockouts 20 after the electrical box 12 has been installed in the wall and trimmed. The head 44 comprises a shaft 46 that has a first end 48 and a second end 50. The first end 48 is coupled to the distal end 38 of the rod 36.

A plurality of fingers 52 is provided. Each of the fingers 52 is coupled to and extends laterally away from the shaft 46. The fingers 52 are positioned adjacent to the second end 50. Additionally, the fingers 52 are arranged to form a cross-like shape. The fingers 52 lie on a plane oriented perpendicular to a longitudinal axis of the second section 42. The fingers 52 are positioned within the opening 22 in a selected one of the knockouts 20 to facilitate removal of the knockout 20.

In use, the selected knockouts 20 are removed after the electrical box 12 is installed. The fingers 52 break the knockouts 20 loose from the electrical box without damaging the wall 24. The electrical box 12 is wired in the convention of residential or commercial electrical codes after the selected knockouts 20 have been removed from the electrical box 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A knockout removal tool configured to remove knockouts from an electrical box, said tool comprising:
   an electrical box having a front side and a pair of lateral walls coupled to and extending rearwardly from said front side, said front side being open, each of said lateral walls having a plurality of knockouts, each of said knockouts having a cross shaped opening extending therethrough, said electrical box being configured to be positioned within a wall such that said front side lies on a plane being planar with an exposed surface of the wall;
   a handle having a first end, a second end and an outer wall extending therebetween, said outer wall being curvilinear such that said handle has a cylindrical shape, said first end being flat, said second end being convexly arcuate;
   a rod coupled to said first end, said rod having a distal end with respect to said first end, said rod being inserted through said front side such that said distal end is directed toward one of said lateral walls while said handle remains outside of said electrical box, said rod having a first section forming an angle between 100° and 150° with respect to a second section;
   a head coupled to said rod, said head engaging said knockouts to facilitate removal of said knockouts after said electrical box has been installed and trimmed, said head comprising a shaft having a first end and a second end, said first end being coupled to said distal end of said rod; and
   a plurality of fingers each coupled to and extending laterally away from said shaft, said fingers being positioned adjacent to said second end of said shaft, said fingers being arranged to form a cross-like shape.

2. The tool according to claim 1, further comprising said fingers lying on a plane being oriented perpendicular to a longitudinal axis of said second section.

3. A knockout removal tool configured to remove knockouts from an electrical box, said tool comprising:
   an electrical box having a front side and a pair of lateral walls coupled to and extending rearwardly from said front side, said front side being open, each of said lateral walls having a plurality of knockouts, each of said knockouts having a cross shaped opening extending therethrough, said electrical box being configured to be positioned within a wall such that said front side lies on a plane being planar with an exposed surface of the wall;
   a handle having a first end, a second end and an outer wall extending therebetween, said outer wall being curvilinear such that said handle has a cylindrical shape, said first end being flat, said second end being convexly arcuate;
   a rod coupled to said first end, said rod having a distal end with respect to said first end, said rod having a first section forming an angle between 100° and 150° with respect to a second section, said rod being inserted through said front side such that said distal end is directed toward one of said lateral walls while said handle remains outside of said electrical box;
   a head coupled to said rod, said head engaging said knockouts to facilitate removal of said knockouts after said electrical box has been installed and trimmed, said head comprising:
      a shaft having a first end and a second end, said first end being coupled to said distal end of said rod; and
      a plurality of fingers each coupled to and extending laterally away from said shaft, said fingers being positioned adjacent to said second end, said fingers being arranged to form a cross-like shape, said fingers lying on a plane being oriented perpendicular to a longitudinal axis of said second section, said fingers being positioned within said opening in a selected one of said knockouts to facilitate removal of said knockout.

4. A knockout removal tool configured to remove knockouts from an electrical box, said tool comprising:
   a handle having a first end, a second end and an outer wall extending therebetween, said outer wall being curvilinear such that said handle has a cylindrical shape, said first end being flat, said second end being convexly arcuate;
   a rod coupled to said first end, said rod having a distal end with respect to said first end, said rod having a first section forming an angle between 100° and 150° with respect to a second section, said rod being configured to be inserted through a front side of an electrical box such that said distal end is directed toward a lateral wall of the electrical box to facilitate said handle remaining outside of the electrical box;
   a head coupled to said rod, said head being configured to engage a knockout in the electrical box to facilitate removal of the knockout after the electrical box has been installed and trimmed, said head comprising:
      a shaft having a first end and a second end, said first end being coupled to said distal end of said rod; and
      a plurality of fingers each coupled to and extending laterally away from said shaft, said fingers being positioned adjacent to said second end, said fingers being arranged to form a cross-like shape, said fingers lying on a plane being oriented perpendicular to a longitudinal axis of said second section, said fingers being configured to be positioned within an opening in the knockout to facilitate removal of the knockout.

* * * * *